(12) United States Patent
Okumura et al.

(10) Patent No.: US 7,125,623 B2
(45) Date of Patent: Oct. 24, 2006

(54) SEPARATOR FOR SOLID POLYMER TYPE FUEL CELL AND PROCESS FOR PRODUCING THE SAME

(75) Inventors: Hiroya Okumura, Osaka (JP); Takashi Shibata, Osaka (JP)

(73) Assignee: Japan Composite Co., Ltd., Tokyo (JP)

( * ) Notice: Subject to any disclaimer, the term of this patent is extended or adjusted under 35 U.S.C. 154(b) by 23 days.

(21) Appl. No.: 09/950,081

(22) Filed: Sep. 12, 2001

(65) Prior Publication Data

US 2002/0055030 A1 May 9, 2002

(30) Foreign Application Priority Data

Sep. 13, 2000 (JP) ............................. 2000-278589

(51) Int. Cl.
*H01M 8/02* (2006.01)
*H01B 1/20* (2006.01)

(52) U.S. Cl. ........................ 429/34; 429/12; 252/511
(58) Field of Classification Search ............... 429/34; 252/511
See application file for complete search history.

(56) References Cited

U.S. PATENT DOCUMENTS

| 4,301,222 | A | * | 11/1981 | Emanuelson et al. | ....... 429/251 |
|---|---|---|---|---|---|
| 4,684,676 | A | * | 8/1987 | Diefenbach | ................. 523/411 |
| 5,569,710 | A | * | 10/1996 | LaFleur | ........................ 525/57 |
| 6,087,442 | A | * | 7/2000 | LaFleur | ........................ 525/57 |
| 6,251,308 | B1 | * | 6/2001 | Butler | ........................ 252/511 |
| 6,365,069 | B1 | * | 4/2002 | Butler | ........................ 252/511 |

FOREIGN PATENT DOCUMENTS

| JP | 4-267062 | 9/1992 |
|---|---|---|
| JP | 10-334927 | 12/1998 |
| WO | 00/25372 | 5/2000 |

* cited by examiner

*Primary Examiner*—Mark Ruthkosky
(74) *Attorney, Agent, or Firm*—Wenderoth, Lind & Ponack, L.L.P.

(57) ABSTRACT

A separator for solid polymer-type fuel cell is produced by molding the resin composition which comprises an electroconductive agent and a radical-polymerizable thermosetting resin system by a resin molding method. The electroconductive agent comprises a carbon powder. The radical-polymerizable thermosetting resin system may comprise a radical-polymerizable resin (especially, a vinyl ester-series resin) and a radical-polymerizable diluent. It is preferred that the double bond equivalent of the radical-polymerizable resin may about 200 to 1,000 and that the hardened radical-polymerizable thermosetting resin system has a glass transition temperature of 120° C. or more. The weight ratio of the electroconductive agent to the radical-polymerizable thermosetting resin system may be about 55/45 to 95/5. Such a separator is suitable for fuel cell (in particular, solid polymer-type fuel cell), and can be produced with advantageous for commercial production.

12 Claims, No Drawings

SEPARATOR FOR SOLID POLYMER TYPE FUEL CELL AND PROCESS FOR PRODUCING THE SAME

FIELD OF THE INVENTION

The present invention relates to a resin composition useful as a separator of a solid polymer-type fuel cell, a separator formed with the resin composition, and a process for producing the separator.

BACKGROUND OF THE INVENTION

A solid polymer-type fuel cell comprises a solid polymer electrolytic membrane composed of an ion exchange membrane (a polymer membrane having ion conductivity) such as perfluorocarbonsulfonic acid in which a sulfonic acid group is introduced into a fluorocarbon backbone such as a polytetrafluoroethylene backbone, two electrodes disposed on both sides of the electrolytic membrane, separators with grooves for supplying a gas such as hydrogen gas and oxygen gas to each electrode, and two current collectors disposed on backside of these separators.

Among these constituting members, the separator is required to have gas-imperviousness, low electrical resistance (electrical conductivity), resistance to sulfuric acid, and high mechanical strength. Traditionally, there is studied a method for molding a plate member made of titanium or graphite by a mechanical processing such as a cutting processing. However, this process lacks mass-productivity and it is difficult to carrying out on industrial scale.

Moreover, Japanese Patent Application Laid-Open No. 334927/1998 (JP-10-334927A) discloses a separator of a solid polymer-type fuel cell obtained by molding a resin composition which comprises a carbon powder, a thermosetting resin (phenolic resin, polyimide resin, epoxy resin, furan resin) by means of a resin molding process. However, the slow hardening of a phenolic resin used as the thermosetting resin results in the low productivity. For example, in Example 10 of the patent literature, post-hardening for 10 hours or more is required. Moreover, a gas such as water vapor generates as accompanied with hardening the phenolic resin so that warp forms in the hardened material and gas-imperviousness is deteriorated.

Further, Japanese Patent Application Laid-Open No. 267062/1992 (JP-4-267062A) discloses a gas separator for a fuel cell composed of stainless-steel or copper. However, although industrial productivity is high by the metal material, cell properties significantly lower due to deterioration of the material.

SUMMARY OF THE INVENTION

Thus, an object of the present invention is to provide a separator suitable for a fuel cell (in particular, solid polymer-type fuel cell) and a process capable of producing the separator with industrial advantageous.

Another object of the present invention is to provide a separator for a solid polymer-type fuel cell having gas-imperviousness, low electrical resistance, durability(especially, resistance to an acid such as resistance to sulfuric acid), and high mechanical strength, and a process for producing the separator with ease and effective.

Still another object of the present invention is to provide a separator of a solid polymer-type fuel cell with high dimensional accuracy, and a process for producing the separator with high molding accuracy.

A further object of the present invention is to provide a resin composition suitable for the above separator.

The inventors of the present invention found that, by using an electroconductive agent and a radical-polymerizable thermosetting resin in combination, a separator for a fuel cell which has not only material properties but also industrial productivity required of a separator can be obtained. The present invention was accomplished based on the above findings.

That is, the resin composition for a separator of a fuel cell of the present invention comprises an electroconductive agent and a radical-polymerizable thermosetting resin system. The radical-polymerizable thermosetting resin system may comprise at least a radical-polymerizable resin (especially, a radical-polymerizable resin and a radical-polymerizable diluent). From viewpoints of resistance to acid (e.g., resistance to sulfuric acid), mechanical properties and moldability, a vinyl ester-series resin (in particular, a vinyl ester-series resin in which (meth)acrylic acid is added to a bisphenol-type epoxy resin) is preferred as the radical-polymerizable resin. It is preferred for crosslinking that the double bond equivalent of the radical-polymerizable resin is about 200 to 1,000 (preferably about 200 to 800). It is preferred from the viewpoint of temperature for using a separator that the hardened radical-polymerizable thermosetting resin system has a glass transition temperature of 120° C. or more. The radical-polymerizable diluent may comprise at least an aromatic vinyl compound (especially, styrene). The weight ratio of the electroconductive agent to the radical-polymerizable thermosetting resin system may be about 55/45 to 95/5. The electroconductive agent preferably comprises a carbon powder. The resin composition may comprise a carbon powder, a radical-polymerizable vinyl ester-series resin having a plurality of α, β-ethylenically unsaturated double bonds, and a monomer having α, β-ethylenically unsaturated double bond, and the weight ratio of the vinyl ester-series resin to the monomer may be about 100/0 to 20/80, and the weight ratio of the carbon powder to the total amount of the vinyl ester-series resin and the monomer may be about 55/45 to 95/5. The resin composition further comprises a low-profile agent (in particular, a thermoplastic resin such as a styrenic thermoplastic elastomer, a saturated polyester-series resin, and a vinyl acetate-series polymer). The amount of the low-profile agent may be about 0.1 to 30 parts by weight relative to 100 parts by weight of the radical-polymerizable thermosetting resin system.

The present invention also includes a separator for a solid polymer-type fuel cell formed with the resin composition (e.g., carbon separator). The separator is excellent in gas-imperviousness and durability. Moreover, the resin composition has excellent moldability. Therefore, the present invention also includes a process for producing the separator (e.g., carbon separator) by molding the resin composition by means of a resin molding method. Moreover, in the process, the resin composition may be kneaded with a pressure kneader and molded.

Incidentally, in the specification, the term "radical-polymerizable thermosetting resin system" means a resin composition comprising at least a radical-polymerizable resin, and is also used to include a resin composition comprising the radical-polymerizable resin and a radical-polymerizable diluent (monomer). Moreover, the term "radical-polymerizable resin" means a polymeric or oligomeric compound having a radical-polymerizable unsaturated bond, and the term "radical-polymerizable diluent" means a monomeric compound (monomer) having a radical-polymerizable unsaturated bond.

DETAILED DESCRIPTION OF THE INVENTION

[Electroconductive Agent]

As the electroconductive agent (or electrically conductive agent), a variety of components such as carbon powders (a conventional artificial or synthetic graphite powder, expanded graphite powder, natural graphite powder, coke powder, electroconductive carbon black), carbon fibers and metal powders can be employed as far as the above component mainly contributes to decline electric resistance of the separator. These electroconductive agents can be used singly or in combination. Powder electroconductive agent such as carbon powder is usually employed. Since the electroconductive agent is tightly packed, a powder in which the grain size is adjusted, or a powder which is previously surface-treated can be also employed.

The average (mean) particle size of the electroconductive agent (in particular, carbon powder) can not specify unconditionally because of having a close relevancy to the ratio of the radical-polymerizable thermosetting resin system, but is usually about 10 nm to 100 μm, preferably about 20 nm to 80 μm and more preferably about 1 to 50 μm.

[Radical-polymerizable Thermosetting Resin]

It is sufficient that the radical-polymerizable thermosetting resin system comprises at least a radical-polymerizable resin, and the radical-polymerizable thermosetting resin system may comprise a radical-polymerizable resin alone. As the radical-polymerizable resin, there may be mentioned a resin or an oligomer having a $\alpha$, $\beta$-ethylenically unsaturated bond (a polymerizable unsaturated bond), for example, vinyl ester-series resins, unsaturated polyester-series resins, urethane (meth)acrylates, polyester (meth)acrylates and the like. These radical-polymerizable resins can be used singly or in combination. The radical-polymerizable resin usually has a plurality of $\alpha$, $\beta$-ethylenically unsaturated bonds.

(1) Vinyl Ester-series Resin

The vinyl ester-series resin (e.g., epoxy (meth)acrylate) is a ring-opening and addition reaction product of an epoxy group with a carboxyl group of a compound having a $\alpha$, $\beta$-ethylenically unsaturated bond, and is an oligomer having a $\alpha$, $\beta$-ethylenically unsaturated bond such as (meth)acryloyl group at its terminal position. The vinyl ester-series resin includes, for example, a reaction product of a compound having one or more epoxy groups in a molecule with an ethylenically unsaturated compound having a carboxyl group such as an unsaturated monobasic acid.

The compound having one-or more epoxy groups in a molecule includes epoxy resins, compounds having epoxy group and (meth)acryloyl group in a molecule.

As epoxy resin, there may be mentioned glycidyl ether-type epoxy resins, glycidyl ester-type epoxy resins, alicyclic epoxy resins in which a double bond of cycloalkene ring such as cyclohexene ring is epoxidated, glycidyl amine-type epoxy resins, copolymerization-type epoxy resins and the like.

As the glycidyl ether-type epoxy resin, there may be mentioned bisphenol-type epoxy resin [e.g., epoxy resins having a bis(hydroxyphenyl)$C_{1-10}$ alkane backbone such as bisphenolA-type, bisphenolF-type and bisphenolAD-type epoxy resins, bisphenolS-type epoxy resin], novolak-type epoxy resins (e.g., phenol-novolak-type, cresol-novolak type epoxy resins), aliphatic epoxy resins (e.g., hydrogenated bisohenolA-type resin, propyleneglycol mono- or diglycidyl ether, pentaerythritol mono- to tetraglycidyl ether), monocyclic epoxy resins (e.g., resorcine glycidyl ether), heterocyclic epoxy resins (e.g., triglycidylisocyanurate having a triazine ring, hydantoin-type epoxy resin having a hydantoin ring), tetrakis(glycidyloxyphenyl)ethane and the like.

As the glycidylester-type epoxy resin, there may be mentioned glycidyl esters of carboxylic acids (especially, polycarboxylic acid), for example, diglycidyl phthalate, diglycidyl terephthalate, dimethylglycidyl phthalate, diglycidyl tetrahydrophthalate, diglycidyl hexahydrophthalate and the like.

As the alicyclic epoxy resin, there may be mentioned, for example, alicyclic epoxy acetal, alicyclic diepoxy adipate, alicyclic dipoxy carboxylate, vinylcyclopentadiene dioxide, vinylcyclohexene mono- or dioxide and the like.

As the glycidyl amine-type epoxy resin, there may be mentioned reaction products of amines (particularly polyamines) and epichlorohydrine, for example, tetraglycidyldiaminodiphenylmethane, triglycidylaminphenol, diglycidylaniline, diglycidyltoluidine, and the like.

As copolymerization-type epoxy resin, there may be mentioned, for example, a copolymer having a bisphenolA backbone and a bisphenolF backbone.

These epoxy resins may be halogenated epoxy resins having a halogen atom (e.g., bromine, chlorine). Incidentally, Japanese Patent Application Laid-Open No. 110948/1997 (JP-9-110948A) refers to an epoxy resin which is a commercially available.

The epoxy equivalent of the epoxy resin varies according to the particle size of the electroconductive agent such as carbon powder, and is not particularly limited and is 50 to 5,000 g/eq, preferably about 100 to 1,000 g/eq, more preferably about 150 to 500 g/eq (in particular, about 170 to 250 eq/g).

As the compound having epoxy group and (meth)acryloyl group in a molecule, there may be mentioned $C_{1-4}$alkylglycidyl (meth)acrylate such as glycidyl (meth)acrylate and methylglycidyl (meth)acrylate, (meth)acryloyloxy$C_{4-6}$alkenylene oxide such as 4-(meth)acryloyloxymethylcyclohexene oxide and the like.

Among these epoxy group-containing compounds, glycidylether-type epoxy resins, epoxy resins having a saturated or unsaturated hydrocarbon ring or heterocycle, in particular, bisphenol-type epoxy resin are preferred. The bisphenol-type epoxy resin (e.g., bisphenolA-type epoxy resin) is preferred since the ratio of the electroconductive agent can be increased due to its low viscosity from a viewpoint of resistance to acid (resistance to sulfuric acid). Moreover, the bisphenol-type epoxy resin is used so that the moldability of resin composition improved due to the above properties and the mechanical strength of molded article can be enhanced.

As the ethylenically unsaturated compound having a carboxyl group such as an unsaturated monobasic acid, there may be mentioned, for example, unsaturated monocarboxylic acids such as (meth)acrylic acid, crotonic acid and cinnamic acid, a reaction product of a polybasic acid anhydride with a compound having (meth)acryloyl group and an active hydrogen atom (e.g., hydroxyl group) in a molecule.

As the polybasic acid anhydride, there may be mentioned aliphatic dicarboxylic acid anhydrides such as maleic anhydride and succinic anhydride, aromatic dicarboxylic acid anhydrides such as phthalic anhydride, tetrahydrophthalic anhydride and hexahydrophthalic anhydride. As the compound having (meth)acryloyl group and an active hydrogen atom, there may be mentioned monohydroxy compounds [e.g., hydroxy$C_{2-6}$alkyl (meth)acrylates such as hydroxyethyl (meth)acrylate, hydroxypropyl (meth)acrylate and hydroxybutyl (meth)acrylate], reaction products of (meth) acrylic acid with a polyhydric alcohol [e.g., trimethylolpropane di(meth)acrylate, pentaerythritol tri(meth)acrylate, glycerin di(meth)acrylate].

Among ethylenically unsaturated compounds having a carboxyl group, unsaturated monocarboxylic acids, in particular, (meth)acrylic acid are preferred.

The molar ratio of the ethylenically unsaturated compound having a carboxyl group to the epoxy compound is carboxyl group/epoxy group=0.8/1 to 1.2/1, preferably about 0.9/1 to 1.1/1.

The ring-opening and addition reaction of epoxy group with carboxyl group can be carried out under conventional conditions and, for example, the reaction may be carried out in the presence of a tertiary amine such as trialkylamine and dimethylbenzylamine or a phosphine such as triphenylphosphine as a catalyst at a reaction temperature of about 80 to 150° C. for 1 to 10 hours.

Moreover, in case that there is need for increasing the viscosity of resin during molding, a vinyl ester-series resin capable of increasing its viscosity with an alkali may be used, and may be obtained by adding a polybasic carboxylic anhydride to a hydroxyl group generated by reacting epoxy group with carboxyl group to generate a carboxyl group.

(2) Unsaturated Polyester-series Resin

A reaction product of a unsaturated polybasic acid with a polyol and if necessary, a saturated polybasic acid can be used as the unsaturated polyester-series resin. As the polybasic acid, a dicarboxylic acid or a reactive derivative thereof is usually used.

As the unsaturated polybasic acid, there may be mentioned a $C_{4-6}$aliphatic unsaturated polybasic acid or an anhydride thereof such as maleic anhydride, fumaric acid, maleic acid and itaconic acid.

As the saturated polybasic acid, there may be mentioned $C_{2-10}$aliphatic saturated polybasic acids such as oxalic acid, malonic acid, succinic acid, glutaric acid, adipic acid, suberic acid, and sebacic acid; $C_{8-12}$aromatic polybasic acids or anhydrides thereof such as isophthalic acid, terephthalic acid, phthalic acid, phthalic anhydride, tetrachlorophthalic anhydride, trimellitic acid and pyromellitic acid; $C_{8-10}$alicyclic polybasic acid or anhydride thereof such as 1,4-cyclohexanedicarboxylic acid, tetrahydrophthalic acid, chlorendic acid (HET acid) and nadic anhydride.

The proportion of the unsaturated polybasic acid is, for example, about 25 to 100 mol %, preferably about 30 to 100 mol %, more preferably about 50 to 100 mol % relative to the whole polybasic acid.

As the polyol, there may be mentioned $C_{2-12}$alkylene glycols (e.g., ethylene glycol, propylene glycol, butanediol, 1,5-pentadiol, 3-methyl-1,5-pentadiol, 1,6-hexanediol, neopentyl glycol), polyoxy$C_{2-4}$alkylene glycol (e.g., diethylene glycol, triethylene glycol, dipropylene glycol, triphenylene glycol), aromatic diols (e.g., bisphenolA, bisphenolA-$C_{2-4}$alkylene oxide adducts).

The esterification reaction can be carried out by a conventional method and, for example, can be conducted at an atmosphere of an inert gas in the presence of an esterification catalyst under an ordinary pressure or reduced pressure and an temperature of about 70 to 120° C. with removing formed water from the reaction system.

The molar ratio of the polybasic acid to the polyol is usually carboxyl group of polybasic acid/hydroxyl group of polyol=about 0.7/1 to 1.3/1, preferably about 0.8/1 to 1.2/1.

(3) Urethane (meth)acrylate

A reaction product of a polyurethane oligomer having an isocyanate group at its terminal position with the above hydorxy$C_{2-6}$alkyl (meth)acrylate can be employed as the urethane (meth)acrylate.

A conventional polyurethane oligomer obtainable with the use of excess amount of diisocyanate component relative to diol component can be used as the polyurethane oligomer. The polyurethane oligomer includes, for example, a reaction product of a diisocyanate component (e.g., an aromatic diisocyanate such as tolylenediisocyanate and diphenylmethanediisocyanate, an araliphatic diisocyanate such as xylylenediisocyante and tetramethylxylylenediisocyanate, an alicyclic diisocyanate such as isophoronediisocyanate, an aliphatic diisocyanate such as hexamethylenediisocyanate) with a diol component (e.g., $C_{2-12}$alkylene glycols, polyether diols such as polyoxy$C_{2-4}$alkylene glycols, polyester diols, polycarbonate diols).

The molar ratio of hydroxyl group to isocyanate group of the urethane oligomer is hydroxyl group/isocyanate group=about 0.7/1 to 1.2/1, preferably about 0.8/1 to 1.1/1, more preferably about 0.9/1 to 1/1.

The urethanated reaction is carried out by a conventional method and, for example, is conducted in the presence of a catalyst at an atmosphere of an inert gas at a temperature of about 50 to 100° C.

(4) Polyester (meth)acrylate

A reaction product of a polyester oligomer having hydroxyl group or carboxyl group at its terminal position with (meth)acrylic acid, hydroxy$C_{2-6}$alkyl(meth)acrylate, or glycidyl (meth)acrylate can be used as polyester (meth)acrylate.

The polyester oligomer may be linear, or branched formed by using a polyhydric alcohol (e.g., glycerin) in addition to the monomer constituting the unsaturated polyester. The polyester oligomer can be produced by adjusting the ratio of the polybasic acid (in particular, saturated polybasic acid) and the polyol and conducting the esterification reaction mentioned above.

The amount to be used of (meth)acrylic acid, hydroxy$C_{2-6}$alkyl(meth)acrylate, or glycidyl (meth)acrylate is about 0.8 to 1.2 mol, preferably about 0.9 to 1.2 mol relative to 1 mol of hydroxyl group or carboxyl group of the polyester oligomer.

Among the radical-polymerizable resins, vinyl ester-series resins, in particular, reaction products of bisphenol-type epoxy resin with (meth)acrylic acid are preferred because of having high resistance to acid (e.g., resistance to sulfuric acid) and mechanical properties, and excellent moldflowability.

The double bond equivalent in the radical-polymerizable resin is about 200 to 1,000, preferably about 200 to 800, more preferably about 200 to 650. When the double bond equivalent is too small, a hardened material having the extremely high crosslinking density is formed and it is difficult that the hardened material is used industrially due to its fragility. On the other hand, when the double bond equivalent is too large, crosslinking can not occur sufficiently and it is difficult to obtain the sufficient heat resistance and mechanical properties.

Incidentally, the acid value of the radical-polymerizable resin such as a vinyl-ester-series resin, an unsaturated polyester-series resin, a polyurethane (meth)acrylate and a polyester (meth)acrylate is about 0.1 to 5 mgKOH/g, preferably about 0.5 to 3 mgKOH/g.

(Radical-polymerizable Diluent)

It is preferred that the radical-polymerizable resin is diluted with the use of a reactive diluent having at least one double bond (especially α, β-ethylenically unsaturated bond), i.e., radical-polymerizable diluent in a molecule in order to decrease its viscosity and adjust the crosslinking density.

As the radical-polymerizable diluent, there may be mentioned unsaturated carboxylic acids such as (meth)acrylic acid, crotonic acid and cinnamic acid; $C_{1-12}$alkyl esters of unsaturated carboxylic acids such as methyl (meth)acrylate, ethyl (meth)acrylate, propyl (meth)acrylate, butyl (meth) acrylate, 2-ethylhexyl (meth)acrylate and dodecyl (meth) acrylate; glycidyl esters of unsaturated carboxylic acids such as glycidyl (meth)acrylate; hydroxy$C_{2-8}$alkyl ester of unsaturated carboxylic acids such as 2-hydroxyethyl (meth)acrylate; nitrogen-containing monomer such as (meth)acrylamide, (meth)acrylonitrile and vinyl pyrrolidone; aromatic vinyl compounds such as styrene, vinyl toluene, divinyl benzene and p-t-butylstyrene; $C_{2-8}$alkylene glycol esters of unsaturated carboxylic acids such as ethylene glycol di(meth)acrylate, 1,4-butanediol di(meth)acrylate, 1,6-hexanediol di(meth)acrylate; polyoxyalkylene glycol ester of unsaturated carboxylic acids such as diethylene glycol di(meth)acrylate; polyfunctional (meth)acrylates such as trimethylolpropane tri(meth)acrylate, pentaerythritol tri(meth)

acrylate and pentaerythritol tetra(meth)acrylate. Among these diluents, the aromatic vinyl ester, in particular, styrene is preferred from the viewpoints of moldability and economy. These diluents can be used in singly or in combination.

The aromatic vinyl compound (in particular, styrene) has higher copolymerizability with the radical-polymerizable resin (e.g., vinyl ester-series resin) compared with (meth) acrylic monomers (diluent) so that properties of molded articles (e.g., mechanical strength) can be enhanced. Further, the aromatic vinyl compound has high dilution efficiency (i.e., can easily lower viscosity) so that the moldability can be improved even when used in small amount. Furthermore, the aromatic vinyl compound is superior to other diluents (e.g., acrylic diluents) in chemical resistance. Therefore, it is preferred that the radical-polymerizable diluent comprises at least the aromatic vinyl compound (in particular, styrene).

The weight ratio of the radical-polymerizable resin to the radical-polymerizable diluent can be usually selected within the range of about 100/0 to 20/80, and is about 95/5 to 20/80, preferably about 90/10 to 40/60, more preferably about 90/10 to 55/45. In order to show higher heat resistance, it is advantageous that the amount of the diluent is decreased.

The weight ratio of the electroconductive agent to the radical-polymerizable thermosetting resin system is about 55/45 to 95/5, preferably about 60/40 to 95/5, more preferably about 65/35 to 92/8. When the amount of the electroconductive agent is too small, the electroconductivity (electrically conductive) can not be improved. When the amount of the electroconductive agent is too large, the mold-flowability becomes insufficient so that molding operation becomes to be difficult.

Incidentally, the weight ratio of the electroconductive agent to the radical-polymerizable resin is about 55/45 to 95/5, preferably about 60/40 to 95/5, more preferably about 65/35 to 95/5.

[Low-profile Agent]

In the resin composition of the present invention, it is preferred for the purpose of inhibiting warp and curing shrinkage of the molded article and improving the dimensional accuracy that the low-profile agent (or an agent capable of imparting low shrinkage to a molded article) is contained. In general, since the radical-polymerizable thermosetting resin system shrinks during molding and tends to cause unevenness and warp, the dimensional accuracy is sometimes deteriorated. In this case, dimensional accuracy of molded article can be improved by the low-profile agent.

As the low-profile agent (or low-shrinking agent), there may be mentioned non-polymerizable resins such as polyester-series resins (e.g., saturated aromatic polyester-series resins such as polyethylene terephthalate and polybutylene terephthalate, saturated aliphatic polyester-series resins such as polyethylene adipate, polybutylene adipate and polybutylene sebacate, copolymerizable saturated polyester-series resins having a polyoxyethylene unit), acrylic resins [e.g., homo- or copolymers having a $C_{1-10}$alkyl ester of (meth) acrylic acid as a monomer component such as polymethyl methacrylate], vinyl acetate-series polymers (e.g., polyvinyl acetate, ethylene-vinyl acetate copolymer), styrenic resins [e.g., homo- or copolymers of a styrenic monomer such as polystyrene, copolymers of styrene and a copolymerizable monomer such as styrene-(meth)acrylic acid block copolymer, styrene-(meth)acrylate block copolymer and styrene-vinyl acetate block copolymer, crosslinked polystyrene], polyolefinic resins [e.g., polyethylene, ethylene-(meth) acrylic acid copolymer, ethylene-(meth)acrylate copolymer], thermoplastic elastomer (e.g., styrenic thermoplastic elastomer, olefinic thermoplastic elastomer, polyester-series thermoplastic elastomer, polyvinyl chloride-series thermoplastic elastomer, polyurethane-series thermoplastic elastomer). Among these low-profile agents, styrenic thermoplastic elastomers [e.g., styrene-diene-series copolymer (e.g., styrene-butadiene block copolymer, styrene-isoprene block copolymer or hydrogenated thereof)], saturated polyester-series resins, vinyl acetate-series polymers (e.g., polyvinyl acetate) are preferred.

These low-profile agents can be used singly or in combination. The amount of the low-profile agent is about 0.1 to 30 parts by weight, preferably about 0.5 to 25 parts by weight, more preferably about 1 to 20 parts by weight relative to 100 parts by weight of the radical-polymerizable thermosetting resin system. When the amount of the low-profile agent is small, the dimensional accuracy tends to be deteriorated. When the amount is too large, properties such as thermal resistance are declined.

The number average molecular weight of the low-profile agent can be selected according to the species of the thermosetting resin, and is not particularly limited, but is usually about 1,000 to $10\times10^5$, preferably about 2,000 to $5\times10^5$, more preferably about 3,000 to $5\times10^5$.

When a resin composition containing the low-profile agent is molded, the shrinking rate of the molded article is decreased to not more than 0.15%, preferably not more than 0.1%, more preferably not more than 0.05% so that the dimensional accuracy can be improved.

To the radical-polymerizable thermosetting resin system may be added a rubber component in order to improve the property of the separator as a hardened material such as tenacity and impact resistance. As the rubber component, there may be mentioned liquid rubbers or modified thereof [e.g., acrylonitrile-butadiene rubber (NBR) having the terminal carboxyl group, NBR having the terminal epoxy group, NBR having the terminal vinyl group], microfine particulate rubbers (e.g., crosslinked acrylic microfine particle). The amount of the rubber component is usually about 1 to 30 parts by weight relative to 100 parts by weight of the radical-polymerizable thermosetting resin system.

[Curing Agent and Curing Promoter]

The resin composition of the present invention can be easily hardened by adding a conventional curing agent and if necessary, a conventional curing promoter used for hardening the radical-polymerizable thermosetting resin system.

As the curing agent, there may be mentioned organic peroxides, for example, aliphatic peroxides (e.g., methyl ethyl ketone peroxide, t-butyl peroxy2-ethylhexanoate, di-t-butyl peroxide, lauroyl peroxide), aromatic peroxides (e.g., benzoyl peroxide, dicumyl peroxide, cumene hydroperoxide, t-butyl peroxybenzoate), alicyclic peroxides (e.g., cyclohexanone peroxide). The amount of the curing agent is about 0.1 to 5 parts by weight, preferably about 0.5 to 3 parts by weight, more preferably about 1 to 3 parts by weight relative to 100 parts by weight of the radical-polymerizable thermosetting resin system.

As the curing promoter, there may be mentioned metal salts (e.g., transition metal salts such as cobalt naphthenate and cobalt octanoate), amines (e.g., tertiary amines such as dimethylaniline, diethylaniline), acetylacetone. The amount of the curing promoter is about 0.01 to 3 parts by weight, preferably about 0. 05 to 2 parts by weight, more preferably about 0.1 to 2 parts by weight relative to 100 parts by weight of the radical-polymerizable thermosetting resin system.

[Other Additives]

If necessary, to the resin composition of the present invention may be also added a conventional additive such as a filler (e.g., aluminum hydroxide, glass powder, calcium carbonate, talc, silica, clay, glass balloon), polymerization inhibitor (e.g., hydroquinone, t-butylcatechol), reinforcing fiber (e.g., glass fiber, carbon fiber), release agent (e.g., metal soap such as calcium stearate, zinc stearate, silicone or fluorene-containing organic compound, phosphoric acid-series compound), thickner (e.g., oxide or hydroxide of magnesium or calcium).

[Glass Transition Temperature of the Hardened Material]

It is preferred that the glass transition temperature of the hardened material of the radical-polymerizable thermosetting resin system comprising at least radical-polymerizable resin (i.e., the radical-polymerizable resin alone or a resin composition comprising the radical-polymerizable resin and the radical-polymerizable diluent) is 120° C. or more (especially, about 140 to 200° C.). Since a solid polymer-type fuel cell is sometimes used at upper temperature of not less than 100° C., it is preferred that a separator is in the form of glass and retains sufficient elasticity around this temperature.

[Method for Molding the Resin Composition and its Use]

The resin composition of the present invention can be molded by a conventional molding method because of its high flowability and moldability. The resin molding method includes, for example, a conventional method for molding resin such as injection molding and compression molding. More concretely, the resin composition can be injected into the given mold and applied with heat and pressure to obtain a molded article. In particular, by utilizing a radical reaction, not only generation of warp can be inhibited but also an uniform molded article can be obtained with short time. Further, since the molded article can be obtained by a method for molding a resin, there is no need for cutting process and a groove as a gas-passageway can be formed precisely. Incidentally, deairing or defoaming of the resin composition may be carried out in order to obtain uniform molded article.

Incidentally, when the resin composition is kneaded with the use of a conventional kneader, a powder or coarse particulate compound is sometimes formed. On the other hand, when the resin composition is kneaded with the use of a pressure kneader (or a kneader capable of kneading under pressure), a viscous or clay-like uniform compound can be obtained. In particular, even when the electroconductive agent is packed in high concentration, an uniform compound having excellent flowability can be prepared. Thus, when a compound is molded by a pressure kneader, a molded article, which is smooth surface without unevenness and has the excellent outer appearance without any defects such as cavity, can be obtained. Further, mechanical properties such as compression strength and bending or flexural strength of the molded article can be improved.

In the pressure kneader, the pressure is not particularly limited as far as an uniform compound is obtained, and is about 0.1 to 10 kgf/cm$^2$ (about $9.8 \times 10^3$ to $9.8 \times 10^5$ Pa), preferably about 0.3 to 8 kgf/cm$^2$, more preferably about 0.5 to 8 kgf/cm$^2$ (in particular, about 1 to 8 kgf/cm$^2$).

The blade shape of the pressure kneader includes Banbury type, Sigma blade, single curve and the like. Among these shapes, banbary-type is preferred. The rotation number of the blade is not particularly limited, and is about 5 to 150 rpm, preferably about 10 to 120 rpm. The kneading temperature is not particularly limited, and is about room temperature to about 100° C., preferably about room temperature to about 80° C. (e.g., about room temperature to 50° C.). Incidentally, the kneading can be carried out at suitable atmosphere, and is usually conducted in air. Moreover, the kneading is usually carried out under shading.

In the present invention, clay-like or viscous compound can be obtained by kneading the resin composition with the pressure kneader. The viscosity at 25° C. of the compound during molding is about $1 \times 10^2$ to $1 \times 10^6$ Pa·s, preferably about $1 \times 10^3$ to $1 \times 10^6$ Pa·s, more preferably about $1 \times 10^3$ to $1 \times 10^5$ Pa·s (determined by Heripas viscosimeter). Incidentally, by means of kneading with a pressure kneader, the mechanical strength and thermal conductivity can be enhanced, and in particular, thermal conductivity can be improved even when using a non-electroconductive material (e.g., low-profile agent). Thus, a molded article without any defects can be obtained.

The hardened material of the resin composition of the present invention shows gas-imperviousness, low electrical resistance, resistance to acid (resistance to sulfuric acid), and high mechanical strength, and can be easily molded by a resin molding method. Thus, the resulting molded article can be used in a variety of applications such as electric or electronic device parts, and in particular, is useful for a separator of a solid polymer-type fuel cell equipped with a solid polymer electrolytic membrane.

The separator is usually in the form of plate and has a groove for gas-passageway supplying with hydrogen gas or oxidant gas (e.g., oxygen-containing gas such as oxygen gas). The thickness of the separator is about 1 to 10 mm (especially about 2 to 5 mm), and one or more grooves may be formed in the separator.

Since the hardened molded article made of the resin composition of the present invention can contain large amounts of an electroconductive agent, the molded article has high electroconductivity, high mechanical strength, low gas-perviousness, excellent durability (especially, resistance to an acid such as resistance to sulfuric acid), and high dimensional accuracy. Further, since the resin composition of the present invention can be molded by a resin molding method, and is a compound having an excellent flowability, the resin composition is also superior in moldability. Thus, the resin composition of the present invention is suitable as a material for a separator of a fuel cell, especially solid polymer-type fuel cell.

EXAMPLES

Hereinafter, the present invention will further be described based on the following examples.

Example 1

To a four-neck flask equipped with a stirrer, a condenser, a nitrogen-inlet, and thermometer were charged 374 g of bisphenolA-type epoxy resin (manufactured by Toto Kasei Co. Ltd., epototoYD128, epoxy equivalent 187 g/eq), 172 g of methacrylic acid, 0.2 g of triphenylphosphine, 0.1 g of hydroquinone as a thermal polymerization inhibitor, and reacted for 8 hours at 120° C. to obtain 546 g of vinyl ester resin having an acid value of 1.8 mgKOH/g. The vinyl ester resin was diluted with 364 g of styrene monomer to obtain a resin composition.

The resin composition (180 g) was surely kneaded with 450 g of artificial graphite powder (manufactured by SEC Co. Ltd., SGL25, average particle size of 25 μm), 850 g of artificial graphite powder (manufactured by SEC Co. Ltd., SGB20, average particle size of 20 μm) and 3.6 g of t-butylperoxybenzoate (manufactured by Nippon Yushi Co. Ltd., TBPB), and after deairing, cured in a plate mold (300×300×8 mm) under 50 kg/cm$^2$ ($4.9 \times 10^6$ Pa) at 150° C. for 2 minutes to obtain the molded plate.

Example 2

A molded plate was obtained in the similar manner to Example 1 except for using 280 g of the resin composition of Example 1 and 1100 g of artificial graphite powder (SGB20).

Example 3

A molded plate was obtained in the similar manner to Example 1 except for using 450 g of the resin composition of Example 1, 500 g of artificial graphite powder (SGL) and 200 g of artificial graphite powder (SGB).

Incidentally, when 1.5 g of t-butylperoxybenzoate (manufactured by Nippon Yushi Co. Ltd., TBPB) was added to the used vinyl ester-series resin composition, the glass transition temperature of the hardened one was 160° C.

In the plates obtained by Examples 1 to 3, the following properties were evaluated. The results are shown in Table 1.

(Electric Resistance)

The electric resistance was determined according to JIS R 7202.

(Bending Strength)

The bending strength was determined according to JIS K 7203 of three point bending method.

(Gas-perviousness)

The gas-perviousness was determined with nitrogen gas and was shown by the following formula Nitrogen gas-perviousness=(perviousness amount of nitrogen gas)×(thickness of test piece)/(time)× (cross section)×(differential pressure)[unit:$cm^2$/sec·atm]

(Resistance to Sulfuric Acid)

The outer appearance of the plate after immersing for 1 month at 50° C. to 50 weight % of sulfuric acid was evaluated according to the following criteria.

A: change in the outer appearance is not visibly recognized

B: change in the outer appearance is visibly recognized

TABLE 1

|  | Electric resistance [μ·Ω·cm] | Bending strength [kg/mm$^2$] | Gas-perviousness [cm$^2$/sec·atm] | Resistance to sulfuric acid |
|---|---|---|---|---|
| EX. 1 | 1000 | 4.8 | <10$^{-6}$ | A |
| EX. 2 | 1200 | 5.4 | <10$^{-6}$ | A |
| EX. 3 | 19600 | 6.5 | <10$^{-6}$ | A |

As apparent from Table 1, the plate formed with the resin composition of the present invention has low electric resistance, high bending strength, low gas-perviousness and excellent resistance to sulfuric acid.

Example 4

The resin composition (280 g) obtained in Example 1 was kneaded with 330 g of artificial graphite powder (manufactured by SEC Co. Ltd., SGL10, average particle size of 10 μm), 770 g of artificial graphite powder (manufactured by SEC Co. Ltd., SGL25, average particle size of 25 μm) and 5.6 g of t-butylperoxybenzoate (manufactured by Nippon Yushi Co. Ltd., TBPB) by a conventional kneader, a molded plate was obtained in similar manner to Example 1. Incidentally, the kneaded compound is coarse particulate.

Example 5

The resin composition (224 g) obtained in Example 1 was kneaded with 28 g of styrene-butadiene block copolymer (D-KX410CS, Shell JSR Elastomer), 330 g of artificial graphite powder (manufactured by SEC Co. Ltd., SGL10, average particle size of 10 μm), 770 g of artificial graphite powder (manufactured by SEC Co. Ltd., SGL25, average particle size of 25 μm) and 5.6 g of t-butyl peroxybenzoate (manufactured by Nippon Yushi Co. Ltd., TBPB) by a conventional kneader, a molded plate was obtained in similar manner to Example 1. Incidentally, the kneaded compound is coarse particulate.

Example 6

A plate is molded in similar manner to Example 5 except for kneading with the use of a pressure kneader under a pressure of 3.92×10$^6$ Pa (4 kgf/cm$^2$), and at 40° C. and 50 rpm. Incidentally, the kneaded compound is clay-like.

Example 7

A plate is molded in similar manner to Example 6 except for using saturated polyester resin (manufactured by Toyobo Co. Ltd., vylon330) in lieu of styrene-butadiene copolymer. Incidentally, the kneaded compound is clay-like.

In the plates obtained in Examples 4 to 7, the above mentioned electric resistance, bending strength and resistance to sulfuric acid were determined, and further, thermal conductivity, shrinking rate, specific gravity and warp were determined according to the following methods.

(Thermal Conductivity)

Two plates (50 mm×50 mm×10 mm) were piled, and the thermal conductivity was determined by Hotdisk method (a method for determining thermal conductivity by relatively comparing with an international standard material according to NIST of United States) at 23° C. with the use of thermal property analyzer (manufactured by TPA-501 type (Kyoto Denshi Kogyo Co. Ltd.)). Incidentally, the determination was carried out three times and the thermal conductivity was represented as an average value.

(Shrinking Rate)

The linear shrinking of a plate (300 mm×300 mm×5 mm) was determined.

(Warp)

Plates (300 mm×300 mm×1 mm) were allowed to stand at 23° C. under 50% RH for 1 day. An error in thickness of each plate was less than 0.1 mm. Each plate was disposed on an even glass plate, the distance between each of four corners (edges) of the plate and the glass plate surface was determined when the center point of the plate was fixed. The warp was represented as the average value of the distances.

TABLE 2

|  | Electric resistance [μ·Ω·cm] | Bending Strength [kg/mm$^2$] | Gas-perviousness [cm$^2$/sec·atm] | Thermal conductivity [W/(m·K)] | Shrinkage Rate [%] | Specific gravity | Warp |
|---|---|---|---|---|---|---|---|
| Ex. 4 | 1000 | 5.5 | <10$^{-6}$ | 29 | 0.16 | 1.90 | 14 |
| Ex. 5 | 1000 | 6.1 | <10$^{-6}$ | 31 | 0.05 | 1.84 | 4.1 |
| Ex. 6 | 1000 | 6.5 | <10$^{-6}$ | 36 | 0.04 | 1.83 | 3.2 |
| Ex. 6 | 1000 | 6.7 | <10$^{-6}$ | 35 | 0.04 | 1.83 | 3.6 |

As apparent from Table 2, by containing the low-profile agent, shrinking and warp of the molded article can be inhibited. Moreover, when kneading is carried out by the pressure kneader, a molded article having high bending strength, high thermal conductivity, low shrinking and low warp can be obtained.

What is claimed is:

1. A process for producing a separator for a solid polymer-type fuel cell, which comprises kneading a resin composition with a pressure kneader under a pressure of $9.8 \times 10^3$ to $9.8 \times 10^5$ Pa higher than atmospheric pressure and molding the kneaded compositions, wherein the resin composition comprises an electroconductive agent and a radical-polymerizable thermosetting resin system comprising a vinyl ester-series resin, wherein the weight ratio of the electroconductive agent to the radical-polymerizable thermosetting resin system is 65/35 to 92/8.

2. The process according to claim 1, wherein the radical-polymerizable thermosetting resin system comprises a vinyl ester-series resin and a radical-polymerizable diluent.

3. The process according to claim 1, wherein the vinyl ester-series resin is (meth)acrylic acid added to a bisphenol-type epoxy resin.

4. The process according to claim 1, wherein the double bond equivalent of the vinyl ester-series is 200 to 1,000.

5. The process according to claim 1, wherein the hardened radical-polymerizable thermosetting resin system has a glass transition temperature of 120° C. or more.

6. The process according to claim 2, wherein the radical-polymerizable diluent comprises at least an aromatic vinyl compound.

7. The process according to claim 1, wherein the electroconductive agent comprises a carbon powder.

8. The process according to claim 1, wherein the resin composition comprises a carbon powder, a radical-polymerizable vinyl ester-series resin having a plurality of $\alpha$, $\beta$-ethylenically unsaturated double bonds, and optionally a monomer having $\alpha$, $\beta$-ethylenically unsaturated double bond, wherein the weight ratio of the vinyl ester-series resin to the monomer is 100/0 to 20/80, and the weight ratio of the carbon powder to the total amount of the vinyl ester-series resin and the monomer is 65/35 to 92/8.

9. The process according to claim 1, wherein the resin composition comprises a carbon powder, a vinyl ester-series resin formed by adding a (meth)acrylic acid to a bisphenol-type epoxy resin and a radical-polymerizable diluent comprising at least a styrene, wherein the double bond equivalent of the vinyl ester-series resin is 200 to 800.

10. The process according to claim 1, wherein the resin composition further comprises a low-profile agent.

11. The process according to claim 10, wherein the low-profile agent comprises at least one member selected from the group consisting of a styrenic thermoplastic elastomer, a saturated polyester-series resin, and a vinyl acetate-series polymer.

12. The process according to claim 10, wherein the amount of the low-profile agent is 0.1 to 30 parts by weight relative to 100 parts by weight of the radical-polymerizable thermosetting resin system.

* * * * *